United States Patent [19]
Calvert

[11] Patent Number: 4,563,853
[45] Date of Patent: Jan. 14, 1986

[54] PACKAGING MACHINE

[75] Inventor: Rodney K. Calvert, Dunwoody, Ga.

[73] Assignee: The Mead Corporation, Dayton, Ohio

[21] Appl. No.: 636,830

[22] Filed: Aug. 1, 1984

[51] Int. Cl.$^4$ .............................................. B65B 21/24
[52] U.S. Cl. ..................................................... 53/48
[58] Field of Search .................... 53/48, 398, 374, 387

[56] References Cited
U.S. PATENT DOCUMENTS 4,160,353  7/1979  Ganz ................................... 53/48 X
4,285,185  8/1981  Collura et al. .......................... 53/48

Primary Examiner—Horace M. Culver
Attorney, Agent, or Firm—Rodgers & Rodgers

[57] ABSTRACT

A machine for packaging a group of articles in a wrap-around type carrier blank having a plurality of pairs of article retaining flaps struck from certain portions of the carrier blank is provided with a plurality of tucking studs movable in synchronism with a group of articles and with the blank on which a flap folding element is pivotally mounted and provided with a cam follower arranged to engage a cam surface whereby said flap folding element is rotated in cooperation with movement of said tucking stud so as to effect folding of a leading and trailing flap.

11 Claims, 11 Drawing Figures

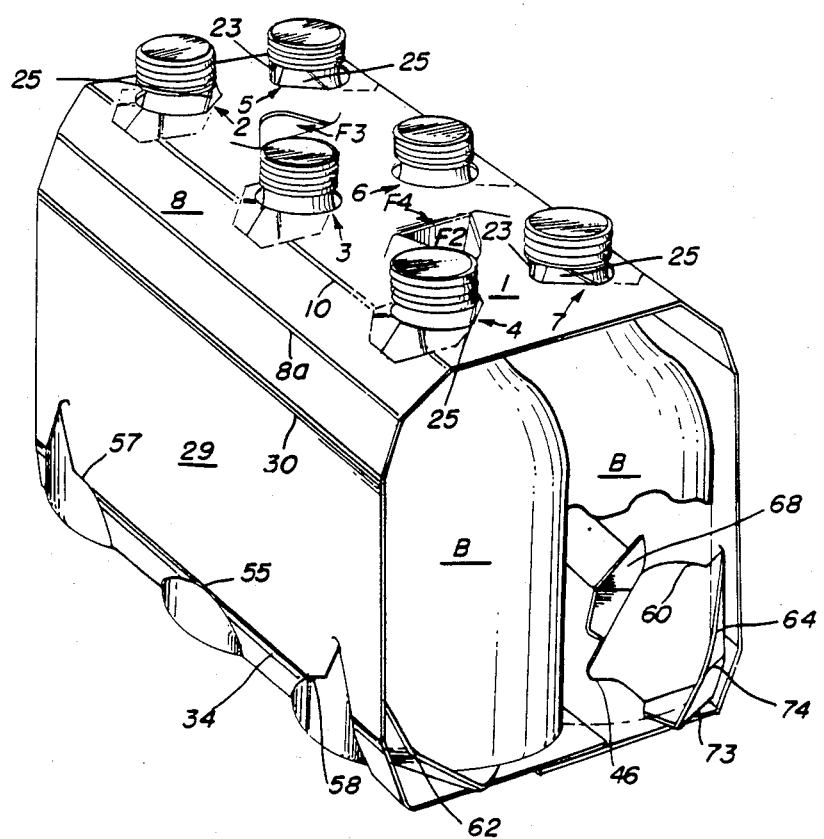
FIG. IA

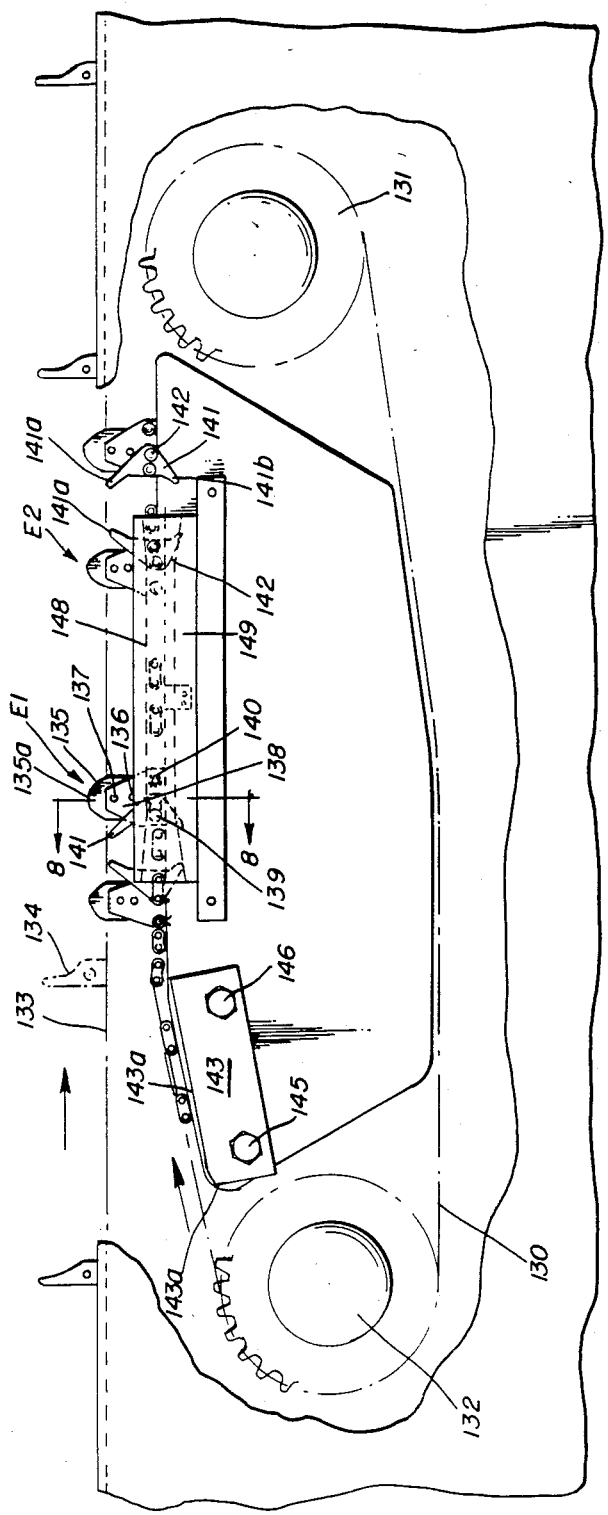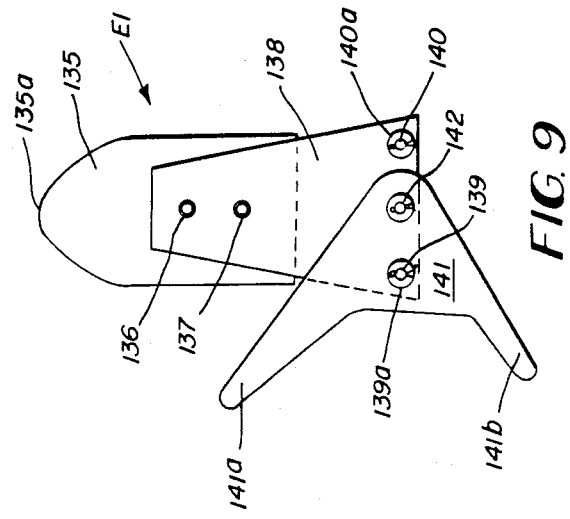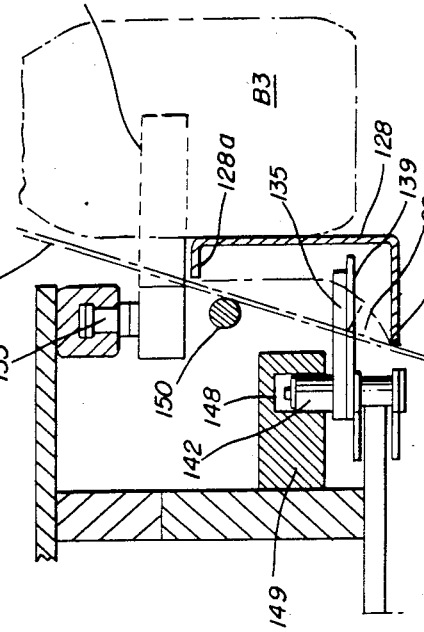

PACKAGING MACHINE

TECHNICAL FIELD

This invention relates to high speed packaging of a group of articles within a wraparound carrier blank having article retaining and carrier reinforcing flaps struck from certain portions of the blank and is specifically concerned with means for folding these flaps inwardly of the blank into positions of enveloping relation relative to packaged articles. While the machine is disclosed herein in conjunction with the packaging of bottles, it is to be understood that the machine is also applicable to packaging of other types of articles.

BACKGROUND ART

U.S. Pat. No. 3,572,003 issued Mar. 23, 1971 and owned by the owner of this invention discloses a packaging machine for manipulating inwardly foldable flaps of a wrap around carrier which utilizes tucking studs mounted on an endless element for engaging inwardly foldable flaps, the machine being characterized by downwardly and inwardly inclined direction of travel of the tucking studs so as to effect proper inward folding of the carrier flaps. The carrier of this prior patent is of the square cornered type.

DISCLOSURE OF THE INVENTION

According to this invention in one form article retaining carrier reinforcing flaps of a wrap around type carrier are manipulated inwardly of the wrapper and toward an associated article group by mechanism including tucking studs movable in synchronism with the group of articles and with the blank together with flap folding elements pivotally mounted on the tucking studs for engaging the article retaining and blank reinforcing flaps in such manner as to fold those flaps inwardly into positions of enveloping relation to the articles to be packaged, the flap folding elements being manipulated by means of fixed cam structure disposed alongside the path of movement of the articles through the packaging operation.

BRIEF DESCRIPTION OF THE DRAWINGS

In the drawings,

FIG. 1A is a perspective view of a package formed by the machine of FIG. 1;

FIGS. 7 and 8 are views concerning the structure of FIG. 6; and

FIG. 9 is an enlarged detailed view of a special tucking stud and an associated flap folding element.

BEST MODE OF CARRYING OUT THE INVENTION

Figure 1:
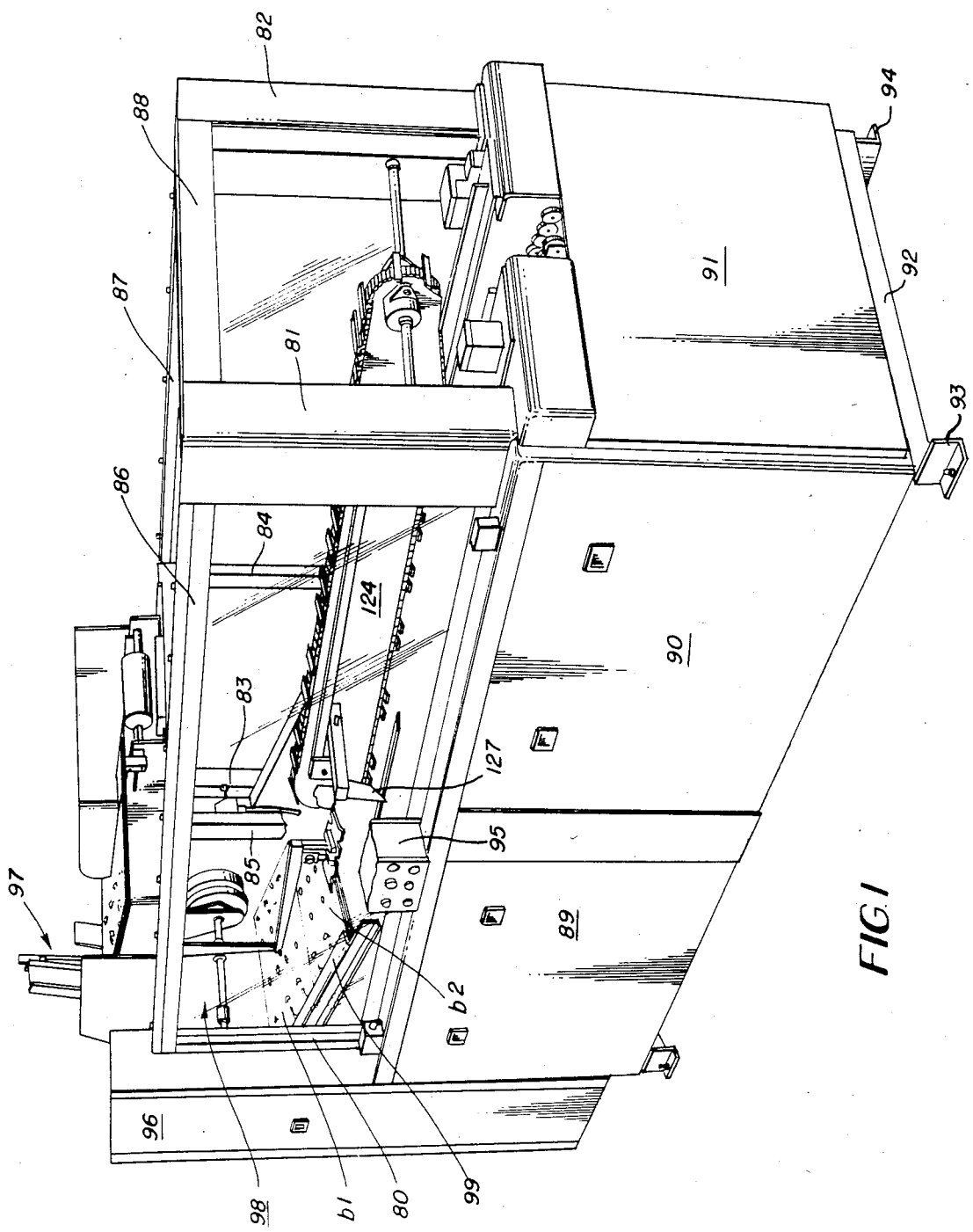
FIG. 1 is a perspective view of a machine which embodies this invention.
Figure 1B:
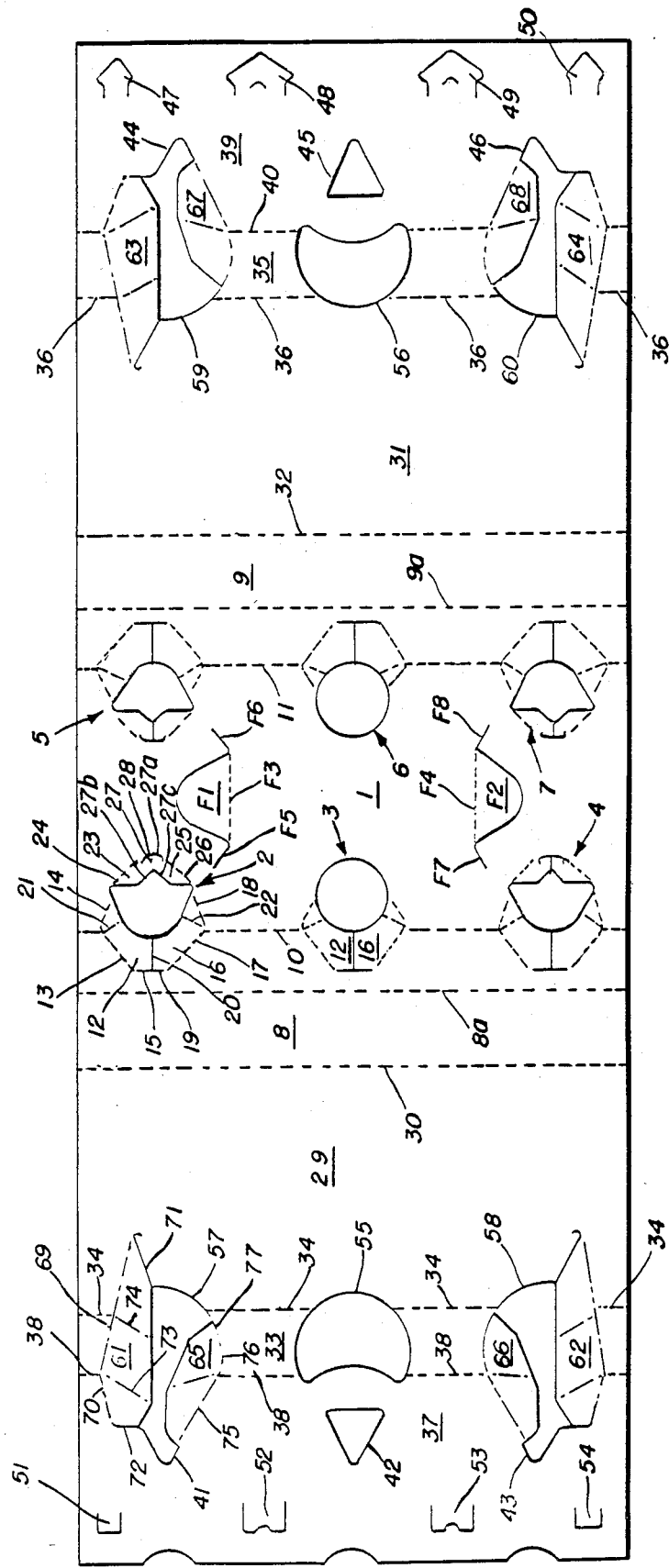
FIG. 1B is a plan view of a blank used in forming the package of FIG. 1A.

The machine and method of this invention are particularly well suited for use in conjunction with the package of FIG. 1A which is formed from the blank of FIG. 1B.

The carrier blank as shown in FIG. 1B includes a top wall generally designated by the numeral 1 in which bottle neck receiving apertures 2–7 are formed. These apertures may extend somewhat into the sloping shoulder panels 8 and 9 which are foldably joined to the side edges of top wall 1 along fold lines 10 and 11 respectively. Fold lines 8a and 9a may be formed in sloping panels 8 and 9 respectively to adapt the wrapper to certain bottle shapes.

Finger gripping tabs F1 and F2 are struck from top wall 1 and are foldably joined thereto along fold lines F3 and F4 respectively. Slits F5 and F6 are angularly related to fold line F3 and slits F7 and F8 are similarly disposed relative to fold line F4.

Certain bottle neck engaging flaps are associated with the neck receiving apertures 2–7 as shown in FIG. 1B. The flaps associated with apertures 2, 4, 5, and 7 are identical and for this reason the flaps associated with aperture 2 only are here described.

Web structure 12 is foldably joined along fold line 13 to sloping shoulder panel 8 and to top wall 1 along fold line 14. Fold lines 13 and 14 intersect at fold line 10 by which sloping shoulder panel 8 is foldably joined to top wall 1. A slit 15 separates one end of web structure 12 from sloping shoulder panel 8 as is indicated. Web structure 16 is complementary to web structure 12 and includes fold lines 17 and 18 which intersect at fold line 10 and slit 19 separates an end of web structure 16 as indicated from sloping shoulder panel 8. Web structures 12 and 16 are separated from each other by slit 20. Fold lines 21 and 22 facilitate bending of web structures 12 and 16 so as to facilitate engagement with the associated bottle neck.

On the other side of aperture 2 an abutment tab 23 is foldably joined to top wall 1 along fold line 24 while an abutment tab 25 is foldably joined to top wall 1 along fold line 26. Fold lines 24 and 26 are disposed in substantially normal relation to each other and are arranged at approximately 45° to the longitudinal axis of the carrier. Tabs 23 and 25 are separated from each other along slit 27 one end of which coincides with arcuate slit 27a and the other end of which coincides with the intersection of angularly related edges 27b and 27c which form a V-shaped notch. Slit 27 is transverse to the longitudinal axis of the carrier. Arcuate slit 27a forms a continuation of adjacent ends of fold lines 24 and 26.

As is apparent from FIG. 1A the abutment tabs such as 23 and 25 are substantially vertical and their upper edges are in close proximity to the caps of the associated bottles. Since the wrapper is loose the bottles may ride upwardly but are securely retained against dislodgment.

The end bottles are restrained from movement out of their normal or perpendicular relation to the main central panel 1 in part because of the engagement between each bottle neck and the associated fold lines 24 and 26.

Since the main central panel is horizontal and the abutment tabs 23 and 25 are vertical, the part of the carrier along fold lines 24 and 26 is quite rigid and affords a firm barrier against bottle movement either inwardly or outwardly of the wrapper tube.

As is obvious from FIG. 1B web structures 12 and 16 are provided for aperture 3 but the small complementary abutment tabs 23 and 25 are eliminated from bottle neck receiving apertures 3 and 6.

Side wall 29 is foldably joined to sloping shoulder panel 8 along fold line 30 while side wall 31 is foldably joined to sloping shoulder panel 9 along fold line 32.

Sloping heel panel 33 is foldably joined to the bottom edge of side wall 29 along interrupted fold line 34 while sloping heel panel 35 is foldably joined to the bottom edge of side wall 31 along interrupted fold line 36.

Bottom lap panel 37 is foldably joined to the bottom edge of sloping heel panel 33 along interrupted fold line 38 while bottom lap panel 39 is foldably joined to the bottom edge of sloping heel panel 35 along interrupted fold line 40.

For tightening the wrapper about a group of articles, tightening apertures 41, 42 and 43 are formed in lap panel 37 while similar tightening apertures 44, 45 and 46 are formed in lap panel 39. With the wrapper disposed about a group of articles and with the lap panels 37 and 39 disposed in overlapping relationship, machine elements enter the tightening apertures and move toward each other so as to tighten the wrapper about the group of articles as is well known.

After the wrapper is tightened, it is locked by means of locking tabs 47-50 which are driven through the apertures defined by retaining tabs 51-54 respectively. The configurations of the locking and retaining tabs are well known and the locking operation is well understood.

Conventional bottle heel receiving apertures 55 and 56 are disposed astride the heel sloping panels 33 and 35 respectively as shown in FIG. 1B.

Bottle heel receiving apertures 57 and 58 are disposed astride the sloping heel panel 33 and extend into adjacent portions of side wall 29 and of lap panel 37 as is shown in FIG. 1B. The tightening aperture 41 constitutes an extension of bottle heel receiving aperture 57 while tightening aperture 43 constitutes an extension of bottle heel receiving aperture 58.

In like fashion bottle heel receiving aperture 59 as well as bottle heel receiving aperture 60 are disposed astride the sloping heel panel 35 and extend into the lower portions of side wall 31 and into the adjacent portions of lap panel 39. Tightening aperture 44 constitutes an extension of bottle heel receiving aperture 59 while tightening aperture 46 constitutes an extension of bottle heel receiving aperture 60.

Bottle engaging carrier reinforcing flaps 61-68 are formed astride heel panels 33 and 35. Flaps 61-64 are identical and a detailed description of flap 61 only is here included. Similarly flaps 65-68 are identical and a description of flap 65 only is herein included.

Bottle engaging carrier reinforcing flap 61 is foldably joined to the carrier along fold lines 69 and 70 which are angularly related and which intersect at fold line 38. A slit 71 separates one end of flap 61 from side wall 29 while a slit 72 separates the other end of flap 61 from lap panel 37.

For facilitating manipulation of the wrapper about an article group and to enhance the cooperation of the flap 61 with the associated bottle, a fold line 73 is formed in flap 61 one end of which coincides with the fold line 38. Similarly a fold line 74 is formed in flap 61 and is disposed in substantially parallel relation with the fold line 73 although these lines may not be precisely parallel with each other.

When the carrier is assembled with the flap 61 in engagement with an associated bottle, the fold line 73 is disposed adjacent to and lies in a plane which is in substantially parallel relation with the lap panel 37.

Bottle engaging and carrier reinforcing flap 65 is foldably joined to lap panel 37 along fold line 75 and to sloping heel panel 33 along fold line 76. A slit 77 separates a curved end portion of flap 65 from sloping heel panel 33.

The bottle engaging and carrier reinforcing flaps such as are shown associated with bottle heel receiving apertures 57-60 are disclosed and claimed in U.S. patent application Ser. No. 636,579 filed Aug. 1, 1984.

The web structures and abutment flaps associated with apertures 2, 4, 5 and 7 are disclosed and claimed in U.S. patent application Ser. No. 636,580 filed Aug. 1, 1984.

With reference to FIG. 1 the machine of that figure incorporates frame structure including corner posts 80, 81, 82 and 83 as well as intermediate side posts 84 and 85. Longitudinal structural elements 86 and 87 are interconnected between the upper ends of corner posts 80, 81 and 82, 83 respectively. Corner posts 81 and 82 are interconnected by a transverse element 88. Closure panels 89, 90 and 91 are mounted on the frame as a means of protecting operators and others from moving machine parts. Transverse support element 92 is connected at the bottom ends of posts 81 and 82 and is supported by feet 93 and 94. Similar structure is provided at the opposite end of the machine. A control box 95 is mounted on intermediate post 85 and a part of this box is cutaway for clarity. A control cabinet 96 is mounted on the frame of the machine adjacent the vertical corner post 80. A hopper 97 is mounted atop the frame of the machine and high speed feeder mechanism generally designated by the numeral 98 is arranged to withdraw carton blanks in sequence from the hopper 97 and to deposit those blanks at the positions indicated for example at b1. The feeder mechanism 98 is disclosed and claimed in U.S. Pat. No. 3,385,595 issued May 28, 1968 and owned by the assignee of this invention. The ends of the blank are disposed within guide structures 99 and forward motion is imparted to the blanks by a pair of endless chains 100 on which the pusher lugs 101 are securely mounted. Each pusher lug 101 engages the trailing edge of a blank such as b1 and b2 and moves the blank in a downwardly converging relation to the horizontal movement of bottles B.

Figure 2:
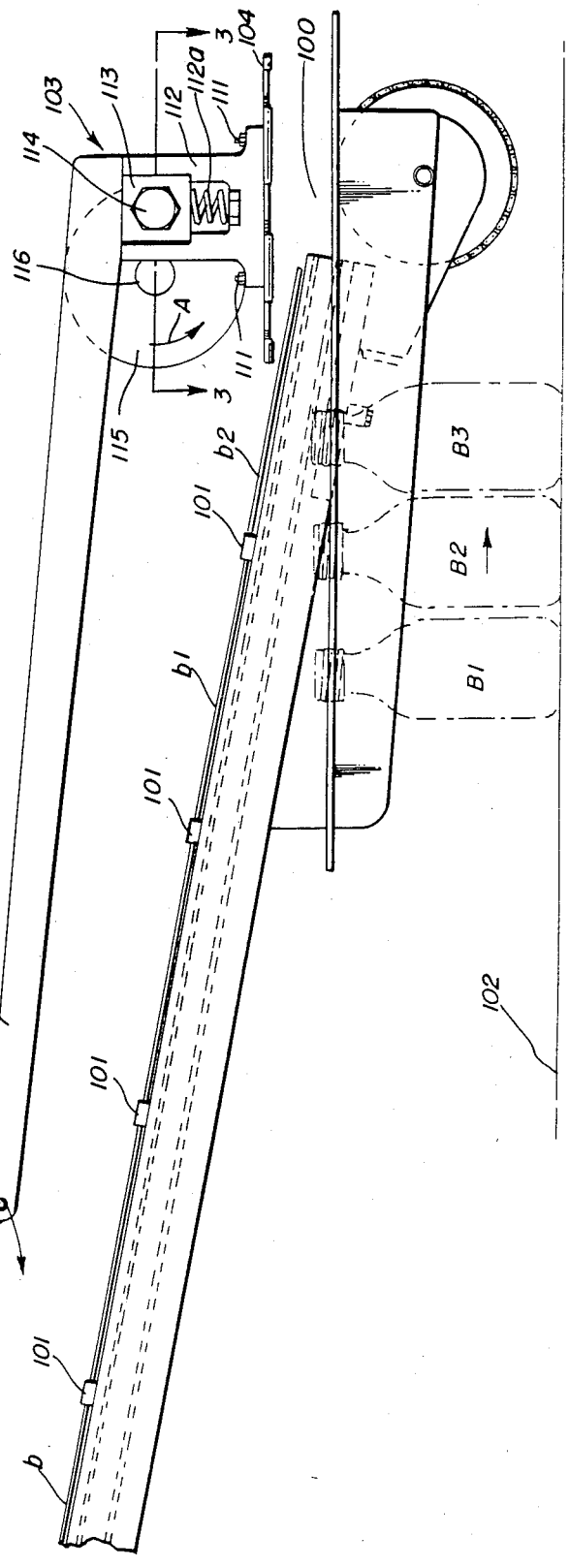
FIG. 2 is a side view of presser means and associated parts.

As is best shown in FIG. 2 groups of bottles are fed from left to right along a predetermined path on conveyor means 102, one such bottle group being designated at B1, B2, and B3. Bottle groups such as B1, B2, and B3 move continuously as do the blanks such as b1 and b2.

Figure 3:
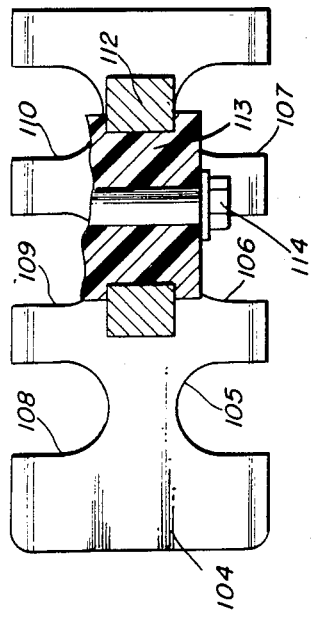
FIG. 3 is an enlarged cross sectional view taken along the line designated 3—3 in FIG. 2.

For the purpose of causing the bottle blanks such as b2 to move downwardly in such manner as to cause the bottle neck receiving apertures formed therein to envelop the bottle necks, presser means such as that generally designated at 103 in FIG. 2 is provided. This presser mechanism includes a blank engaging element 104 shown in plan view in FIG. 3 and which is provided with cutaway areas 105-110 for partially enveloping the necks of bottles arranged in a group of six, i.e., two rows of three bottles each. Cutaway areas 105-110 are sufficiently larger than the outer dimensions of the bottle necks as to avoid collision therewith. Blank engaging means 104 is secured by bolts 111 to a U-shaped structure 112 which is yieldably and slidably mounted on body portion 113 and biased downwardly by compression spring 112a against a stop not shown. Body portion 13 is connected by bolt 114 with a crank in the form of an arcuate structure 115 which is rigidly secured to rotatable shaft 116. Rotatable shaft 116 is arranged with its axes substantially normal to the predetermined path of bottle movement and crank 115 is fixedly secured to shaft 116 and as viewed in FIGS. 1 and 2, 4 and 5 rotate in a counterclockwise direction as indicated by the arrow A. The outer end of crank 115 moves in a circular path. Rotary motion of crank 115 due to the operation of shaft 116 causes the blank engaging element 104 to move in a counter clockwise direction and to inscribe a circular path of movement. Thus with a group of bottles such as B1, B2 and B3 and the associated bottles in the other row disposed underneath the presser means 103, bottle engaging element 104 moves downwardly and forwardly in the direction of bottle movement and of the blank during the lower part of its circular path of movement into engagement with the blank such as b2 and causes that blank to move downwardly so that its neck receiving apertures envelop the necks of the bottles B1, B2 and B3 and the associated bottles in the opposite row, the notches 105-110 coinciding with the carrier apertures and bottle neck. Rotation of blank engaging element 104 is at such a velocity as to accommodate continuous forward motion of the bottle group B1, B2 and B3. The circumference of the circle inscribed by bottle engaging element 104 is slightly larger than the longitudinal length of the package including bottles B1, B2 and B3. Thus the arcuate portion of the circle inscribed by blank engaging element 104 allows for spacing between one bottle group such as B1, B2 and B3 and a succeeding bottle group. Of course an important feature of this arrangement has to do with the fact that the bottles and associated blanks move continuously from left to right and without interruption.

For the purpose of preventing rotary motion of body portion 113 and of the other elements associated therewith such as the blank engaging element 104 and the U-shaped element 112, positioning means is provided and includes linkage means such as swing link 117 pivoted at its upper end to a fixed pivot 118 and pivoted at its lower end by a pin 119 to a shift link 120 which at its right hand end is rigidly secured to the body portion 113. Thus during rotation of shaft 116 and of blank engaging element 104, the swing link 117 may oscillate about its fixed pivot 118 for a limited distance while the shift link 120 reciprocates from left to right and vice versa in order to accommodate rotation of the crank 115 and parts associated therewith while at the same time preventing rotation of the blank engaging element 104 and of the parts associated therewith. Driving shaft 116 is operated by suitable chain drive mechanism disposed within the housing 121 best shown in FIGS. 4 and 5 and shaft 116 is rotatable in journal mounting 122 supported by the frame of the machine. The linkage means does not impede the operating movement of the blank engaging means 104.

Figure 4:
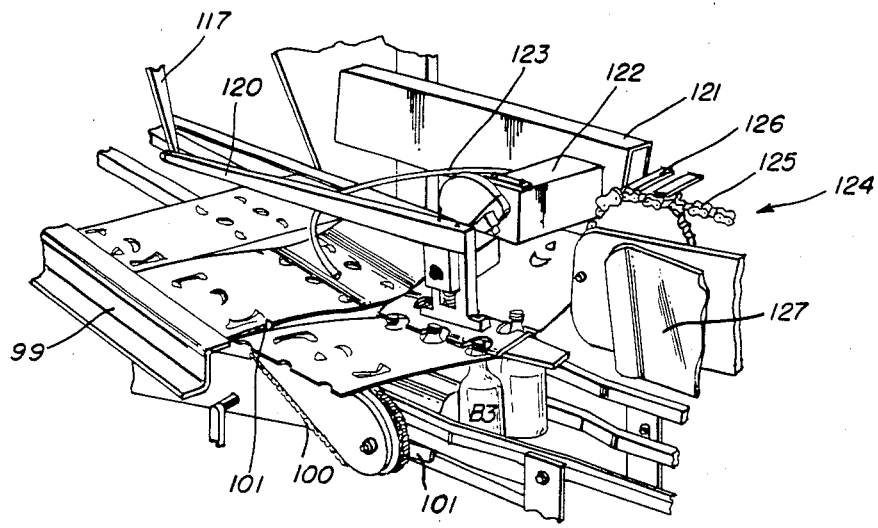
FIG. 4 is an enlarged perspective view of a part of the mechanism shown in FIG. 1 and which corresponds generally to FIG. 2 with the parts shown in the positions which they occupy immediately following downward movement of the top wall of the blank into enveloping relation with the group of bottles.
Figure 5:
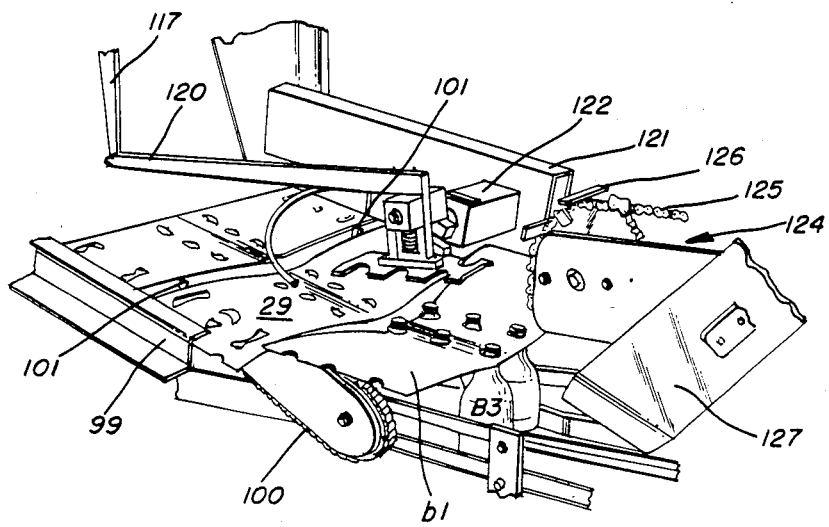
FIG. 5 is a view similar to FIG. 4 and shows the presser means and the blank engaging means in its withdrawn position.

As is apparent from FIGS. 4 and 5 the main central top wall panel of the wrappers are bowed downwardly by a fixedly mounted element 123 so as to facilitate entry of the bottle necks into the apertures formed in the top wall of the blank.

The outer end of crank 115 is moved upwardly and forwardly in the direction of bottle and blank movement to cause the blank engaging means 104 to disengage the blank during the lower part of its circular movement.

The velocity of movement of blank engaging means in the direction of bottle movement is slightly greater than the bottle velocity at the lowermost position of the blank engaging means.

After the blank b1 is moved into enveloping relationship relative to the necks of the bottles as shown in FIG. 5, the package group is moved underneath a beam structure generally designated at 124 and which is of conventional construction. This beam simply overlies and presses downwardly on the carriers as they move from left to right and effectively stabilizes each package group as it moves through the packaging operation. Boom 124 includes an endless chain 125 and presser bars 126 which are of conventional construction.

Mechanism for causing the apertures in the top wall of the carton to envelop the bottle necks is disclosed and claimed in U.S. patent application Ser. No. 636,831 filed Aug. 1, 1984.

The bottle group as shown in FIG. 5 moves from left to right and the side walls of the blank such as 29 and 31 as well as the sloping shoulder and sloping heel panels together with the lap panels 37 and 39 are folded downwardly by rotatable folder mechanism 127 which is conventional.

Following the folding operation, the side walls of the blank are disposed in an angular position such as is represented in FIG. 8 which of course represents only one side wall and one row of bottles such as is indicated in phantom lines at B3. The side wall 29 of the blank is held in angular position by channel guide means such as 128 which is fixed in position on each side of the machine. The flanges 128a and 128b are constructed so as to hold the blank at an appropriate angle as shown.

For the purpose of manipulating the bottle heel receiving flaps such as 61-68 into an inwardly extending position as shown for example in FIG. 1A, mechanism shown in FIGS. 6, 7, 8 and 9 is provided. Of course the structure such as is indicated in fragmentary form in FIG. 6 and in FIG. 7 is disposed on each side of the path of movement of the packaged groups as they proceed through the machine.

Figure 6:
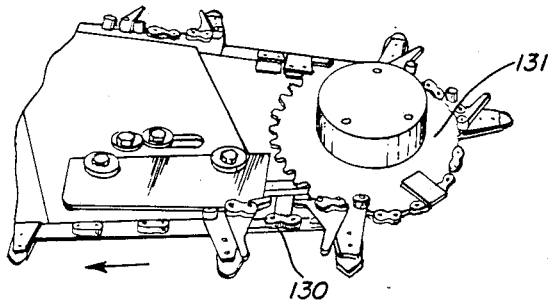
FIG. 6 is an enlarged fragmentary view of mechanism associated with this machine for manipulating certain flaps associated with heel receiving apertures of the carrier.

With reference to FIGS. 6 and 7 an endless chain 130 is trained about driving sprocket 131 and following sprocket 132. For the purpose of moving bottle groups through the machine from left to right as viewed for example in FIG. 7, an endless chain 133 is provided and a plurality of laterally disposed pusher elements 134 engage the rearmost bottle of each bottle group and push the bottle group toward the right. Chain 133 and its associated pusher elements 134 move in synchronism with the chain 130 and with its associated structures such as are indicated at E1 and E2 in FIG. 7 and at E1 in FIG. 9. E1 and E2 are arranged in pairs and respectively enter the heel receiving apertures such as 57-60. Each structure includes a tucking stud such as 135 having a rounded nose portion such as 135a and which is mounted by pins 136 and 137 to a small mounting block 138 which in turn is secured to the chain by means of chain pins 139 and 140. Tucking studs such as 135 are designed to swing the flaps such as 61-68 inwardly.

For the purpose of swinging the flaps such as 61–64 inwardly beyond the positions to which these flaps are folded by elements 135, flap folding element such as 141 is provided and is pivoted at pin 139 to the chain 130. Flap folding element 141 is of general L-shaped configuration and includes a flap engaging part 141a and a cam engaging part 141b. Thus the movable flap folding element 141 is pivotally mounted at pin 139 and is provided with a cam roller 142 wherey rotary motion of flap folder 141 about pin 139 is effected.

In order to facilitate entry of a folding element such as E1 or E2 into a carrier aperture such as 57, it is necessary that the part 141a be withdrawn inwardly and into general registry with the tucking stud so that it affords no outward projection which might interfere with entry of the entire structure into a carrier aperture such as 57. Toward this end a fixed conditioning cam plate 143 is mounted on the support block 144 by bolts 145 and 146. Thus as a structure such as E1 rides along the cam surface 143a of cam 143 the arm such as 141b rides along the cam surface 143a and causes the flap folding part 141a to swing inwardly relative to the tucking stud 135 thereby facilitating entry of the entire structure into a carrier aperture such as 57. As explained elements 135 swing flaps 61–68 inwardly to positions approximately 90° to the carrier side wall. The flap folding part 141a effects inward swinging movement of a flap such as 61 due to rotation of element 141. This folding operation swings flaps 61–64 through angles greater than 90° to facilitate and insure easy envelopment of the associated bottles. This rotation is imparted by the cooperation of cam roller such as 142 and rollers 139a and 140a associated with pins 139 and 140 all of which ride in groove 148 in cam block 149. Thus with tucking studs such as E1 and E2 disposed within the apertures 57 and 58 action of cam roller 142 in cam groove 148 causes the flap folding element 141 to swing to the positions indicated in FIG. 7 at E1 and E2. This action causes the flaps 61–64 to swing inwardly of the carrier through angles in excess of 90° and into position in which reception of the heels of the associated bottles is facilitated. Once the bottle heels have entered the bottle heel receiving apertures due in part to the inward folding of the carton side wall and the heel sloping panel by a fixed guide such as 150, the package is ready for securement about the package group. Toward this end the package is tightened in known manner and the lap panels 37 and 39 are interlocked by suitable mechanism disposed downstream from the structure shown in FIGS. 6, 7 and 8.

INDUSTRIAL APPLICABILITY

By this invention packaging of groups of bottles or other containers arranged in side by side rectilinear relation within a wrap around type carrier having a plurality of pairs of flaps struck from certain portions of the wrapper is greatly facilitated because inward folding of such flaps at high speed is made possible by the invention.

I claim:

1. A machine for packaging a plurality of articles arranged in at least one row in rectilinear relation in a wraparound-type carrier having a top portion, spaced sidewalls, a pair of bottom lap panels and a plurality of pairs of flaps struck from certain portions of the carrier and constituting article retaining and carrier reinforcing means, said machine comprising means for advancing a group of articles along a predetermined path, means for advancing a wrapper blank along said path and in contact with the upper parts of the articles in a group of articles to be packaged, one flap of each pair of flaps being remote from the adjacent leading or trailing edge of the blank and one flap of each pair of flaps being near the adjacent leading or trailing edge of the blank means for folding said side walls and said lap panels downwardly alongside said group of articles, a tucking stud movable in synchronism with the group of articles and with the blank and disposed generally alongside the path of movement thereof and in generally normal relation to said side walls and lap panels, said tucking stud being movable in a direction convergent to said predetermined path and into engagement with a leading and trailing flap arranged as a pair of flaps and thereafter in a direction generally parallel to said predetermined path for folding said flaps inwardly of the carrier, a flap folding element pivotally mounted on said tucking stud and having a flap engaging part, a cam follower mounted on said flap folding element, and a fixedly mounted cam having a cam surface for receiving said cam follower whereby said flap folding element is rotated so as to swing said flap engaging part into engagement with one of said flaps thereby to fold said one flap inwardly of the carrier and beyond the position to which said one flap is folded by said tucking stud.

2. A machine according to claim 1 wherein a fixed conditioning cam is disposed for engagement by a part of said flap folding element while said tucking stud and said flap folding element are moving in a direction which is convergent to said predetermined path so as to swing said flap engaging part into general registry with said tucking stud.

3. A machine according to claim 1 wherein said tucking stud is arranged to engage and folds the one of said flaps which is most remote from the adjacent leading or trailing edge of the blank.

4. A machine according to claim 1 wherein said flap folding element is arranged so that its flap engaging part engages and folds the one of said flaps which is near the adjacent leading or trailing edge of the blank.

5. A machine according to claim 1 wherein guide means is interposed between said article group and the blank so as to position the blank for cooperation with said tucking stud and said flap folding element.

6. A machine according to claim 5 wherein said guide means comprises a channel structure having a web and side flanges of different dimensions so as to hold the blank at an appropriate angle to cooperate with said tucking stud and said flap folding element.

7. A machine according to claim 1 wherein said tucking stud and said flap folding element are mounted on an endless element movably mounted on a fixed support block.

8. A machine according to claim 1 wherein said cam surface comprises a groove formed in said fixedly mounted cam and having widened outwardly flared end portions.

9. A machine according to claim 1 wherein said tucking stud includes a rounded nose portion.

10. a machine according to claim 1 wherein said flap folding element comprises a pair of angularly related parts.

11. A machine according to claim 10 wherein one of said angularly related parts engages said fixed conditioning cam and the other of said angularly related parts comprises a flap folding part.

* * * * *